June 17, 1930.  G. DUCART  1,764,247

MACHINE FOR TURNING DOWN AND FOLDING THE ENDS OF BOX COVERS

Filed May 31, 1927  5 Sheets-Sheet 1

G. Ducart
INVENTOR

By: Marks & Clerk
Attys.

June 17, 1930.    G. DUCART    1,764,247
MACHINE FOR TURNING DOWN AND FOLDING THE ENDS OF BOX COVERS
Filed May 31, 1927    5 Sheets-Sheet 2
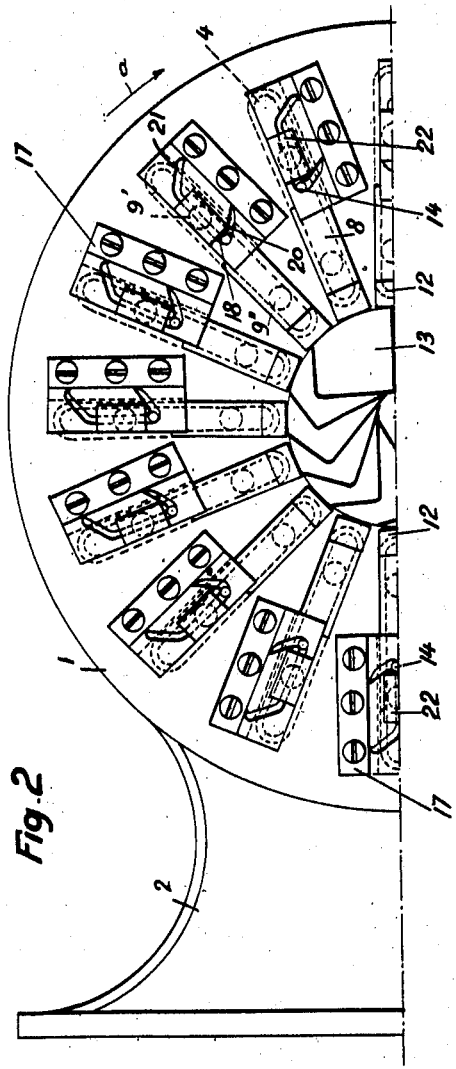

June 17, 1930.  G. DUCART  1,764,247
MACHINE FOR TURNING DOWN AND FOLDING THE ENDS OF BOX COVERS
Filed May 31, 1927  5 Sheets-Sheet 3
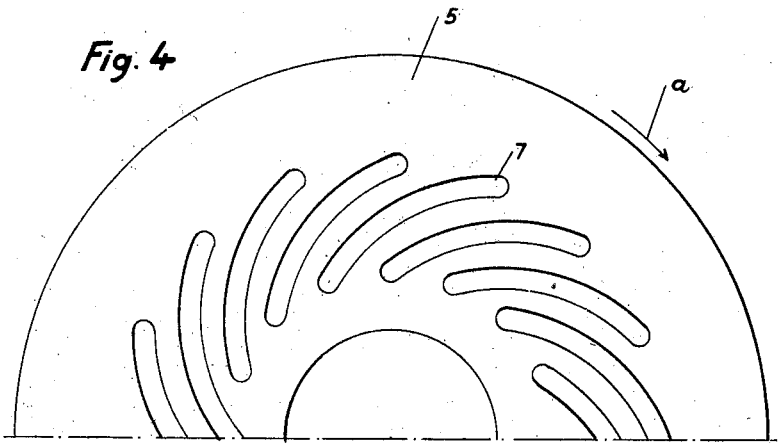
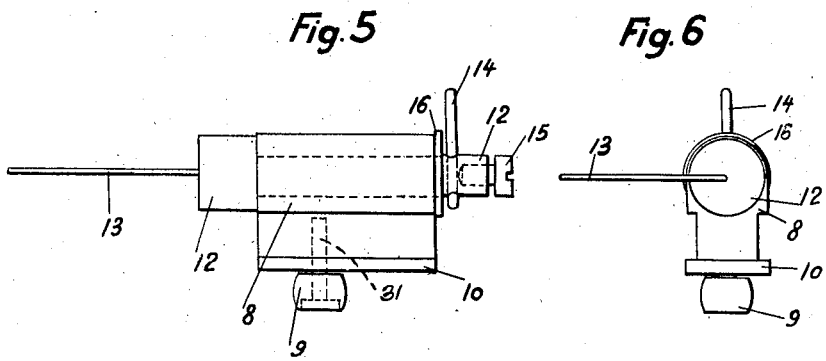
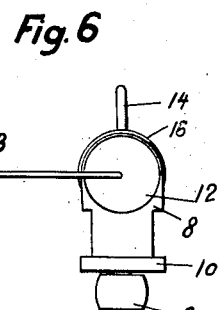
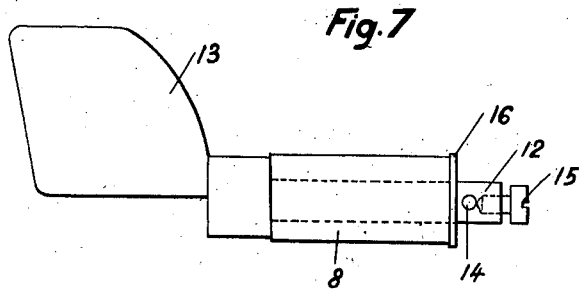

June 17, 1930.  G. DUCART  1,764,247
MACHINE FOR TURNING DOWN AND FOLDING THE ENDS OF BOX COVERS
Filed May 31, 1927   5 Sheets-Sheet 4

G. Ducart
INVENTOR

By: Marks & Clerk
Attys.

June 17, 1930. G. DUCART 1,764,247
MACHINE FOR TURNING DOWN AND FOLDING THE ENDS OF BOX COVERS
Filed May 31, 1927 5 Sheets-Sheet 5

G. Ducart
INVENTOR

By: Marks & Clerk
Attys.

Patented June 17, 1930

1,764,247

UNITED STATES PATENT OFFICE

GUILLAUME DUCART, OF PARIS, FRANCE

MACHINE FOR TURNING DOWN AND FOLDING THE ENDS OF BOX COVERS

Application filed May 31, 1927, Serial No. 195,521, and in France June 4, 1926.

It is known that cylindrical boxes which are preferably made of tinned sheet iron, cardboard, etc., for containing pharmaceutical products, cocoa, tea, etc., are generally wrapped in paper, or other suitable material and that in order to effect this the operation is generally commenced by wrapping the box, by hand or mechanically, in a tubular covering or wrapping extending beyond the top and bottom of the box, the projecting parts or ends being then turned down and folded upon the bottom and the top or lid of the box.

The present invention relates to this second stage of operation or finishing stage and has for its subject a machine for folding the ends of the box covers or wrappers, turning down the folds formed upon the corresponding parts of the box, base or cover, and smoothing this down thus giving a very neat appearance and a perfect hold. This machine is more particularly characterized by the simplicity of construction of the members forming a part of it and the method of producing the various movements of the said members, by its robust construction and by its simple and sure operation.

It is hereinafter described in detail with reference to the accompanying drawing which illustrates diagrammatically one form of the invention given by way of example. In these drawings:

Fig. 2 is a top plan view showing one half of the machine.

Fig. 4 is a similar groove of the movable actuating disc.

Fig. 5 is a front elevation of a blade carrier.

Fig. 6 is an end view thereof.

Fig. 7 is a plan view thereof.

Figure 1:
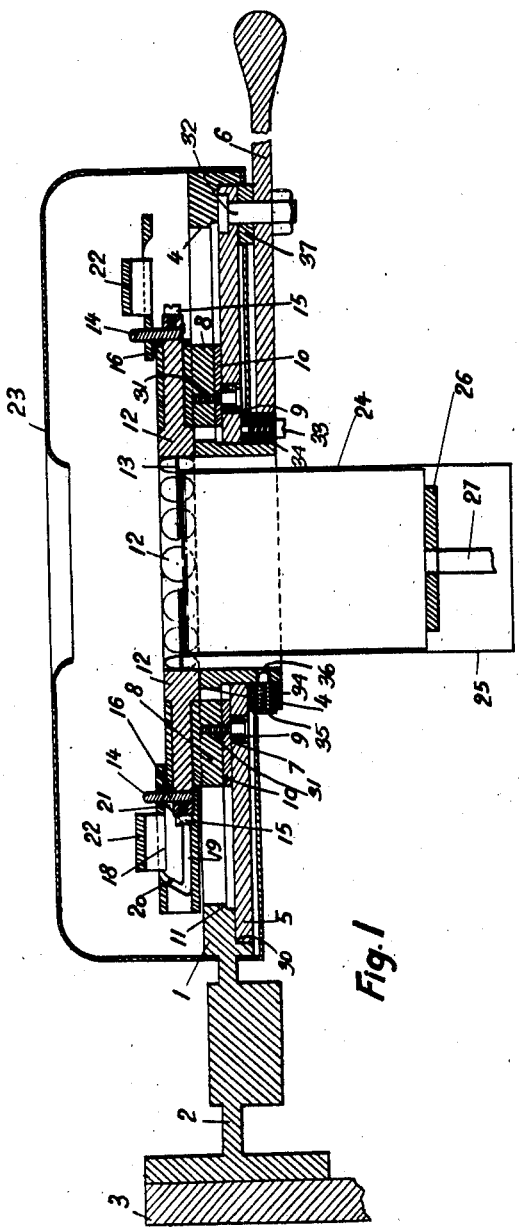
Fig. 1 is a vertical axial section through the general arrangement of the machine.
Figure 3:
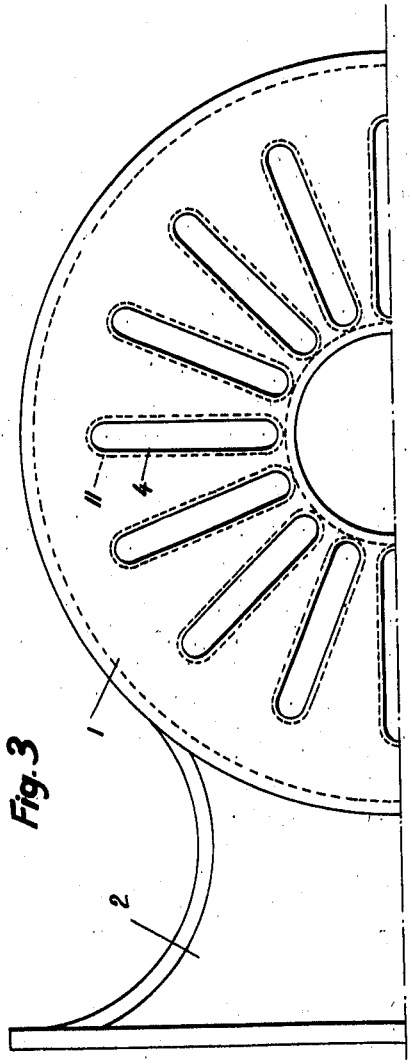
Fig. 3 is a similar view of one half of the fixed supporting plate.
Figure 8:
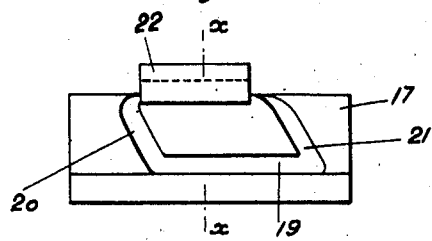
Fig. 8 is a front elevation of a detail of the machine.
Figure 9:
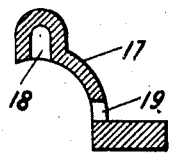
Fig. 9 is a sectional view taken along the line $x$—$x$ in Fig. 8.
Figure 10:
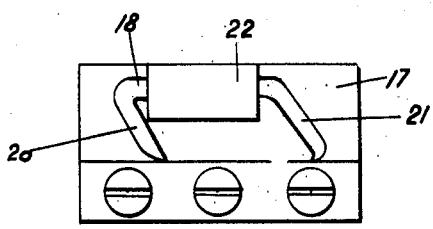
Fig. 10 is a top plan view of the detail shown in Fig. 8.

Referring now, more particularly to the drawings, there is provided an annular supporting disc 1, the attaching extended portion 2 of which is fixed to a plate, wall or other supporting part 3. The said disc 1 is provided with radial grooves or mortices 4. A movable annular disc 5 is lodged in a recess 30 in the disc 1 underneath the latter and is movable by an operating lever 6. The disc 5 is provided with curved grooves or mortices 7 of suitable inclination to the radii of the disc the function of which in connection with the radial slots in the disc 1 will be more specifically described hereinafter.

There is also provided a plurality of blade carriers each of which is formed of a carriage 8 to which is secured at the lower end thereof a threaded rod 31 on which is mounted a roller 9. This roller engages in one of the curved mortices 7 of the movable disc 5 being held against the side of a plate 10 by the threaded rod 31 which latter is anchored in the plate 10. This plate 10 bears against the underside of the disc 1 and also against the radial mortices formed therein. The carriage 8 slides in the upper part of the said mortice 4 of the disc 1.

The movable disk 5 is maintained in position by the rollers 9 each of which rotates freely on the end of a threaded rod 31 screwed in a bore of the carriage 8. When the disk 5 is turned, its curvilinear grooves 7 are displaced at the same time while the rectilinear grooves 4 of the plate remain fixed so that the rollers 9 and the carriages 8 must necessarily be displaced. The lever 6 is fixed to the movable disk 5 through the medium of a bolt 32; the end of the said lever 6 being moreover fixed through the medium of a screw 33 with a ring or collar 34 which surrounds the lower central part of the fixed disk 1 on which it is fastened by means of the screw 35. The ring or collar 34 is adapted to turn freely and engages in grooves 36 in the form of a circumferential arc of the lower central part of the fixed disk 1. A block 37 is inserted between the lever 6 and the disk 5 on the right where they are made integral by the bolt 32.

The lever 6 is thus completely outside the casing 23 which presents an opening for permitting the free displacement of the block 37 when the lever 6 is turned in either direction.

To the upper part of each carriage 8 is mounted a blade carrying shaft 12 adapted to turn in the said carriage and at one end of which is mounted a knife or blade 13 of suitable shape, the other end comprising a finger 14 held by a set screw 15 for example, a washer 16 being mounted if desired upon the shaft of the blade carrier 12 against the carriage 8.

The fingers 14 are disposed in planes perpendicular to that of its corresponding blade 13 so that the vertical position of the said fingers corresponds to a horizontal position of the blades 13 and vice versa. Upon the plate 1 are mounted plates 17 curved in the form of approximately a quarter of a circle to allow for the passage of the carriages 8, each of these plates comprising, upon its convex part four mortices or grooves of which two 18 and 19 are straight for guiding the forward movement and recoil of the blade carrier and two are helicoidal 20 and 21 to produce the turning down and release of the blade in which engages the end of the finger 14 of the blade carrying shaft 12, a bridge 22 serving for holding the central part comprised at the interior of the grooves in the plate 17.

The whole of the mechanism controlling the blade carriers, thus constructed, may be protected by a casing 23 open at the central portion to permit the introduction of the box 24. The latter, surrounded by its cover 25 the ends of which project beyond the ends of the box, is disposed upon a support 26, attached to the end of a rod 27 and actuated in a known manner, for example by means of a pedal permitting the support 26 to be made to rise in order to allow the boxes to be placed or removed. The operation of these blade carriers obtained by means of the above described mechanism and with a view to effecting the work described hereinafter in detail is as follows:

If the movable disc 5 is turned in the direction of the arrow $a$ (Figs. 2 and 4) by means of the operating lever 6 the pins 9 of the carriages 8 occupy at this moment their end position, shown dotted at 9' in Fig. 2, on account of the fact, on the one hand, of the guiding of the carriages by the radial grooves in the fixed plate 1, and of the fact, on the other hand, of the engagement of the pins 9 in the curved grooves 7 in the movable disc 5, the displacement of which tends to make the said pins advance towards the centre, the carriages 8 progressing towards the centre by sliding in the radial grooves 4.

During the first stage of this forward movement, the pins 14 of the blade-carrying shafts 12 being engaged in the straight lower grooves 19 of the blades 17, the blades 13 remain in the raised position, the pins being then horizontal; then during a second stage, the engagement of the pins 14 in the helical grooves 20 produces the rotation of the shafts 12 and consequently the lowering of the blades 13 as shown in Fig. 2, since the pins 14 and the blades 13 are constantly in planes perpendicular to each other, these two stages in the forward movement of the knives corresponding respectively to the formation and turning down of the folds, the pins 9 of the carriages 8 then occupying the position 9''.

If the movable disc 5 is then given a movement of rotation in the opposite direction to the arrow $a$, it will be understood that, on the contrary, the carriages 8 will move towards the peripherly along the radial grooves 4. By the engagement of the pins 14 in the straight upper grooves 18 and the blades 13 in a first stage of the recoil, remain in the turned down position, that is to say flat, and thus smooth down the folds formed, a second stage corresponding to the displacement of the pins 14 in the helical grooves 21 producing the return of the blades 13 into the raised position.

Figure 11:
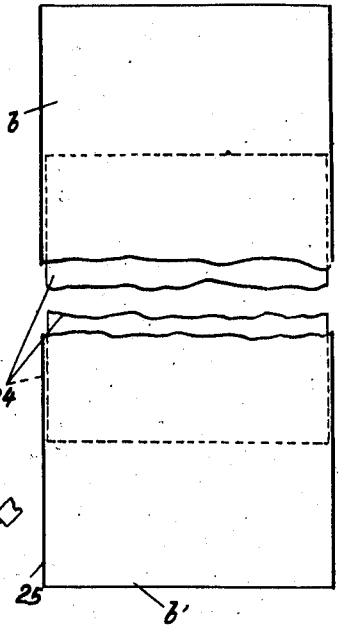
Fig. 11 is a front elevation of a cylindrical box which has been enclosed in a wrapping before the ends of the tubular wrapping have been turned down.
Figure 12:
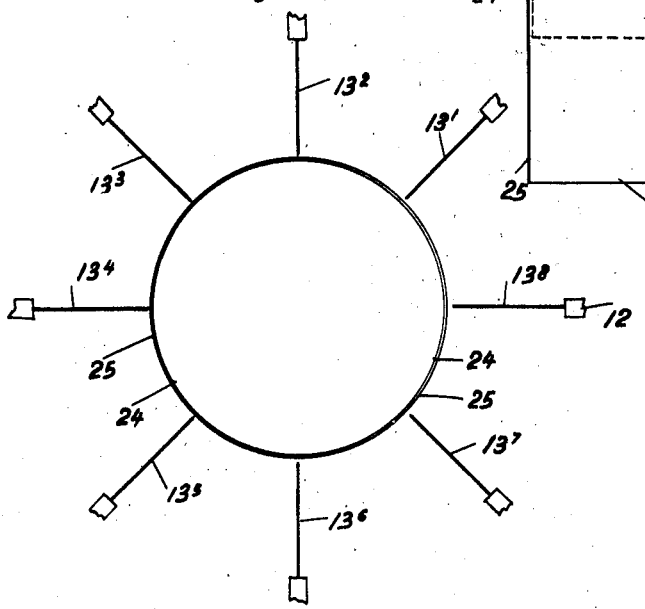
Fig. 12 is a diagrammatic plan view showing the position of the plates before the machine enters into operation.
Figure 15:
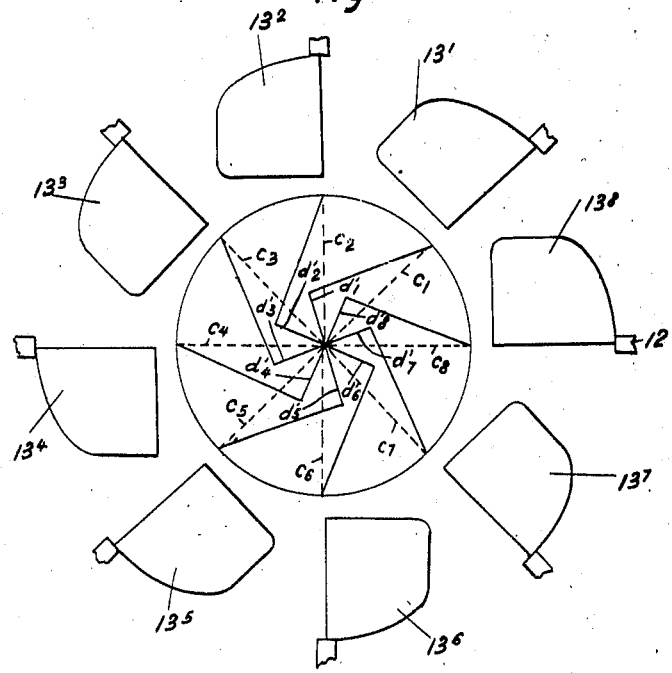
Fig. 15 is a similar view showing the folding of the box terminated, the blades being retained backward but not yet raised as shown in Fig. 12.

The formation of the folds, shown diagrammatically in Figs. 11 and 15, takes place as a result of the methods of operation described above. The box 24 being surrounded with a tubular wrapping 25, the ends $b$ and $b'$ of which extend beyond the ends of the box (Fig. 11), is disposed upon the support 26 of the machine, the raised blades $13^1$, $13^2$ . . . $13^8$ then occupying the position shown in Fig. 12.

When the movable disc 5 is turned in the direction of the arrow $a$ the blades 13 by advancing, in the raised position, define in the end $b$ of the wrapping, portions $b_1, b_2 \ldots b_8$ between two adjacent blades, the said blades producing respectively clear radial folded edges or lines $c_1, c_2 \ldots c_8$ and also near each blade undulations $d_1, d_2 \ldots d_8$ of the portions $b_1, b_2 \ldots b_8$.

Figure 14:
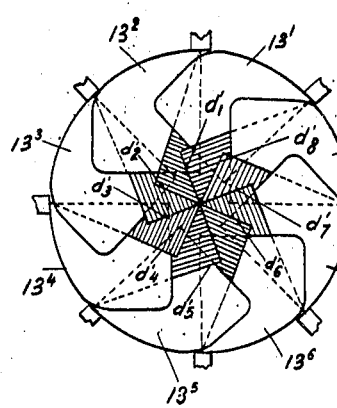
Fig. 14 is a similar view after the folds have been laid down by the blades.
Figure 13:
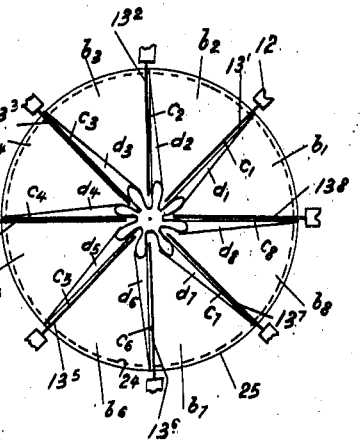
Fig. 13 is a similar view after the formation of the folds upon the end of the wrapping.

The blades 13 are then turned down during the second stage of advance of the carriages 8 and the undulations $d_1, d_2 \ldots d_8$ are each turned down around the lines of folding $c_1 \ldots c_8$ around which the blades pivot, each of the undulations $d_1 \ldots d_8$ being thus taken between two consecutive blades and forming folds $d'_1, d'_2 \ldots d'_8$, the undulations $d_1$, for example, turned down around the line $c'_1$ being supported by the blade $13'$ and pressed by the blade $13^s$ (Fig. 14). The blades 13, remaining in the turned down position during the first part of the return movement, smooth the surfaces of the different folds $d'_1 \ldots d_8$ (Fig. 5) the effect of which is to make the folds very neat and give then a better hold.

It is clearly understood that it is possible without going outside the scope of the invention, to make modifications and improvements in details; it is possible for example to combine with the machine any device of known type, the function of which is to gum a label or the like upon the folds formed; in the same way the use of mechanical equivalent means may be envisaged.

What I claim is:

1. A machine for turning down and folding the ends of wrappers for containers comprising a frame having a central circular opening, movable blades mounted on said frame, in equiangular relation to said opening, means to move the blades radially of said opening to form folds in said wrapper and means to rotate said blades a partial revolution to smooth down the folds formed in the wrapper against the end of the container, said means for advancing said blades also being operable in an opposite direction to withdraw said blades.

2. A machine as claimed in claim 1 in which the frame comprises a fixed plate having a central opening and provided with radial slots, blade carriers mounted to move in said slots, and means to rotate said blades at the end of said radial movements.

3. A machine as claimed in claim 1 in which the frame comprises a fixed plate having a central opening and provided with radial slots, blade carriers mounted to move in said slots, and means to rotate said blades at the end of said radial movement comprising for each carrier a vertical plate mounted on the fixed plate and having helical grooves and driving pins mounted on said blades and engaging in said grooves.

In testimony whereof I affix my signature.

GUILLAUME DUCART.